July 13, 1965    P. L. RICHMAN    3,195,054
PRECISION COMPARISON DEVICE
Filed Jan. 2, 1963    4 Sheets-Sheet 1

INVENTOR.
PETER L. RICHMAN
BY Rosen & Schiller
ATTORNEYS

July 13, 1965  P. L. RICHMAN  3,195,054
PRECISION COMPARISON DEVICE
Filed Jan. 2, 1963  4 Sheets-Sheet 2

INVENTOR.
PETER L. RICHMAN
BY Rosen & Schiller
ATTORNEYS

July 13, 1965  P. L. RICHMAN  3,195,054
PRECISION COMPARISON DEVICE
Filed Jan. 2, 1963  4 Sheets-Sheet 4

INVENTOR.
PETER L. RICHMAN
BY Rosen & Schiller
ATTORNEYS

United States Patent Office 3,195,054
Patented July 13, 1965

3,195,054
PRECISION COMPARISON DEVICE
Peter L. Richman, Lexington, Mass., assignor, by mesne assignments, to Weston Instruments, Inc., Newark, N.J., a corporation of Texas
Filed Jan. 2, 1963, Ser. No. 248,956
5 Claims. (Cl. 328—146)

This invention relates to signal comparators, and more particularly to devices by which the amplitude of a test signal is compared with the amplitude of a reference signal for effectuating operation of an output indicator circuit, whereby the accuracy and stability of the test signal can be evaluated. This application is a continuation-in-part of my co-pending application S.N. 179,849.

In order to calibrate, adjust or check the performance of a circuit or instrument, exemplary voltage signals provided by the circuit may be examined by comparison of the voltage signal with a high precision, substantially constant reference potential of nearly equal value. For visual analysis, the comparison results are generally displayed graphically on an indicator means, such as a cathode ray oscilloscope. A number of circuits have been proposed for accepting a pair of signals to produce an output proportional to the voltage difference between the signals. Many of these devices have used low frequency periodic switches or choppers in their operation. If it is desired to know the sense as well as the value of the voltage difference, such devices have usually employed multiple, synchronized choppers, as a consequence of which, the circuits have been expensive, complex and difficult to adjust.

Where, in addition, high precision comparison is desired, the accuracy of the comparators will be preferably within a few thousandths of a percent of the test signal amplitude. In such cases, if the entire test signal constitutes the input to an oscilloscope, the ratio of full-scale reading to the deviation of the test signal with respect to the reference signal does not allow the minute difference between signals to become apparent. Although the oscilloscope scale can be changed to increase the resolution, the scale change will cause the instrument to be badly overloaded. Not only are oscilloscopes subject to overload capability limitations, but they are subject to drift. This latter can be a source of substantial error when dealing with precisions of the order desired, particularly in cases where the oscilliscope is employed as the measuring instrument itself.

The present invention therefore has as a principal object, the provision of a high-precision comparator device for calibrating a test voltage. Other objects of the present invention are to provide a device of the type described which is characterized by its high precision, stability, simplicity and positive operation in providing an output to an oscilloscope where the relationship between a test signal and a reference level can be readily and accurately determined within the capabilities of the oscilloscope; to provide a comparator device of the type described comprising means for providing an error signal which is the limited sum of a datum voltage subject to test and a precision reference level voltage, the limitation of said sum being within a predetermined magnitude on either or both sides of a level which is zero or ground potential for both the reference and datum voltages, whereby the error signal, in the form of a first wavetrain, is proportional to the difference between the reference and peak datum voltages, and means for forming a second wavetrain from alternate samplings of a plurality of waves of the first wavetrain and samplings of ground potential, the difference in amplitude between the peak values of the wave forms of the first wavetrain and the value of ground being indicative of the stability of and proportional to deviations between peak datum and reference signals; to provide a device of the type described which includes means for amplifying the second wavetrain to increase the resolution between the peak values and ground; to provide a device for comparing an oscillatory or A.C. signal with a known reference voltage, which device has an output in the form of a wavetrain in which the amplitude of the difference between peak values of the A.C. signal and the reference voltage is referable to a second reference level established by a fixed reference plane potential such a ground common to both the A.C. signal and to the reference voltage, thereby providing a stable, common reference base; to provide a device of the type described wherein the datum and reference voltage are in order summed, limited as hereinbefore described, and compared to ground; and to provide a device of the type described wherein the datum and reference voltages are in order compared individually to ground, summed and limited.

For a fuller understanding of the nature and objects of the invention, reference should be had to the following detailed description taken in connection with the accompanying drawings in which.

Generally, the present invention is a device for generating, from a datum signal and a reference signal, a waveform of predetermined characteristics for presentation to a readout device such as an oscilloscope. The waveform comprises a pair of alternately recurring sections. One of the sections is formed from a ground level signal which is common ground to both the datum and reference signals. The other of these sections is formed from an error signal derived from the limited sum of said datum and reference signals. In order to derive the desired final waveform, preferably four processes are basically performed by appropriate means; the datum and reference signals are individually or as a sum, limited or not, sampled or compared to a common fixed reference potential such as ground; the datum and reference signals are summed either before or after comparison with ground; the sum of the datum and reference signals is limited to a predetermined level at least on one side of ground; and at some stage the datum and reference signals are amplified, either as the sum alone or as the limited sum. It will therefore be seen that although operations can occur in various order, limitation always follows summation in time.

Figure 1:
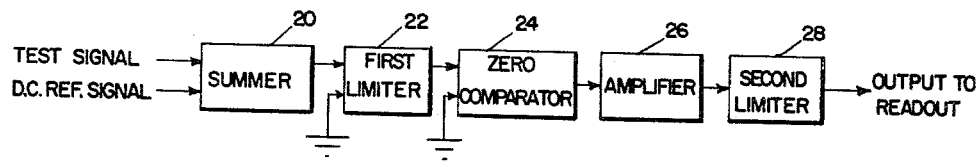
FIG. 1 is a block diagram showing the relations of the elements of one embodiment.

Referring now to the embodiment shown in FIG. 1 there is provided summing means 20, adapted to accept a pair of inputs consisting of a reference voltage and a datum voltage, for summing the two. The datum voltage is, for example, an A.C. signal. Summing means 20 is connected to a first limiting means 22 for extracting that part of the summed waveform which contains information relating to the difference between the two input voltages. In this embodiment this is done by clipping the summed waveform between predetermined levels on either or both sides of a zero or ground potential, and for this reason, the limiting means is shown as having a grounded input. Limiting means 22 is connected with one of two inputs to a zero comparator or chopper 24. The other input of chopper 24 is maintained at ground potential. The zero comparator is a low frequency periodic switch having an output which is connectable in sequence between the two inputs. Thus the output of chopper 24 is a periodic potential or second waveform constituted of the clipped portion of the summed waveform and the ground potential in time-alternate sections. In a preferred embodiment, amplifying means 26 are included for accurately amplifying the second waveform in order to provide better resolution between the peak amplitudes of the alternate sections of the second waveform. The potential resolution without overload in the readout device is still further increased by second limiting means 28 for clipping the amplifier output before presentation to a read-out instrument.

Figure 2:
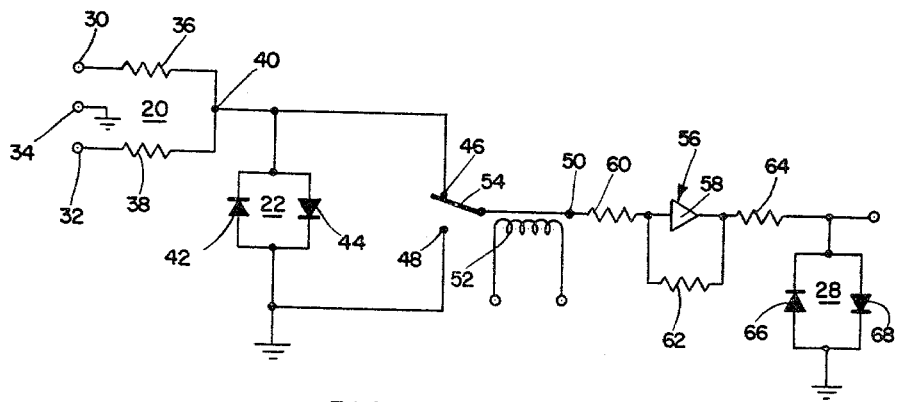
FIG. 2 is a schematic circuit diagram of one form of the embodiment of FIG. 1 in detail.

Referring now to FIG. 2 there will be seen a schematic circuit diagram embodying the principles of the embodiment heretofore disclosed. The circuit includes a pair of input terminals 30 and 32 and a common ground 34. The datum signal intended to be examined is impressed between ground terminal 34 and one of terminals 30 and 32. A precision D.C. reference source is applied between ground and the other of terminals 30 and 32. It will be apparent that because it is primarily intended to provide a precision comparison, as for calibration purposes, the peak value of the input datum voltage will be approximately known; thus the reference voltage can be so selected as to be nearly equal to the datum voltage peak level. Terminals 30 and 32 therefore constitute the input terminals to the summing means. This means, in the form shown in FIG. 2, comprises a resistive network including a pair of resistors 36 and 38. One side of resistor 36 is connected in series to terminal 30, and one side of resistor 38 is connected in series to terminal 32. The other sides of the resistors are connected to one another, as at summing junction 40. The two input signals can be said to be parallel to one another inasmuch as they are both connected to a common ground.

It is possible to connect the inputs to the summing means in other ways. For instance, the datum voltage source may have one side grounded and the other side connected to one polarity of the D.C. reference, the other pole of the reference being coupled via a series resistor to the input of the first limiter. In such an arrangement, the D.C. reference voltage is floating with respect to ground. Thus, it becomes difficult to accurately check or calibrate the D.C. source during operation of the invention.

Alternatively, one side of the D.C. source may be grounded while the other side is connected to one side of the datum voltage source, the other side of the datum voltage source being applied to the input terminal of the first limiting means through a series resistance. This arrangement floats the datum voltage source with respect to ground. Where the datum voltage source, for instance, is derived from a transformer, the floating of the datum voltage may tend to introduce stray capacitive effects.

With the preferred arrangement of inputs in parallel as shown in FIG. 2, neither voltage source is floating. Hence, stray capacitive effects are minimized and the D.C. reference source can readily be checked without adverse effect during operation of the invention.

In the embodiment shown in FIG. 2, the summing means comprises a resistive network in which resistors 36 and 38 preferably are equal to one another within a ratio error of less than 0.003% or better. The accuracy with which the comparison of the two input voltages is to be made is limited to a first order by the precision with which these two resistors can be matched and limited only to a second order by the other electronic components of the circuit. In practice, it has been found that a resistive pair can be obtained with a ratio error of three hundred microvolts out of ten volts (referred to the input) over a full 0° to 52° C. rated temperature range and through a period well exceeding one year.

Summing junction 40 is coupled to one input of first limiting means 22 which in the form shown comprises a pair of diodes 42 and 44 in parallel. The diodes are disposed back-to-back, i.e., the anode of one diode and the cathode of the other are connected to each other and to junction 40. The cathode of the one diode and the anode of the other are similarly connected to each other and to ground. The provision of a passive limiting means of this type ensures minimization of transients and therefore contributes to the precision operation of the invention. For example, these diodes are high-speed (four millimicro-second-recovery) low-capacitance, silicon mesa diodes. The inherent semiconductor breakdown potential provides the outside limits within which the limiting means is operative. The provision of a diode pair in the limiting means allows the latter to clip the wave peaks regardless of the polarities of the signals fed to the summing means. However, with the proper choice of the polarities of the signals, the limiting means need include but one diode appropriately poled.

The zero comparator of the embodiment of FIG. 1 is shown in FIG. 2 as a conventional chopper having a pair of input terminals 46 and 48 and an output terminal 50. One of the input terminals for instance terminal 48, is connected to ground; the other input terminal, in this instance terminal 46, is connected to the ungrounded side of diodes 42 and 44, as at junction 40. The chopper is preferably any low-frequency, low noise, periodic switch in which the alternate connections between input terminals 46 and 48 to output terminal 50 is of the "make-before-break" type to avoid the introduction of transients. The zero comparator includes the usual coil 52 for driving chopper armature 54 at a predetermined switching rate.

Output terminal 50 of the zero comparator is in turn connected to the input of amplifier means which, in FIG. 2, comprises chopper-stabilized operational amplifier 56.

Typically, operational amplifiers are direct-coupled, high-gain, chopped-stabilized negative feedback stabilized amplifiers with wide band-pass characteristics. In the example shown, operational amplifier 56 comprises a very high-gain amplifier stage 58, i.e., one having for instance a gain of many thousand, an impedance of series resistor 60 and a feedback resistor 62. The latter is connected between another summing junction (which lies at the input to amplifier stage 58) and the output of the amplifier stage. The overall gain of such an operational amplifier, because of the virtual ground at the summing junction is then determined by the ratio of the values of resistor 62 to resistor 60. It will be apparent to those skilled in the art that the reason for using an operational amplifier is to provide the relatively distortion-free, stable amplification desired in precision instruments, and particularly to obtain wide-band amplification while maintaining D.C. integrity. Other amplifier devices, capable of meeting these criteria, may also be employed. The output of the amplifier is connected to one side of load resistor 64. The other side of the load resistor is in turn connected to the input of second limiting means 28. The latter means is similar to the first limiting means and thus may comprise a pair of diodes 66 and 68 in parallel, the anode of one diode and the cathode of the other being connected to the other side of load resistor 64, while the cathode of the one diode and the anode of the other are in turn connected to ground. If the polarities of the input signals to the invention can be selected, then limiting means 28, like limiting means 22, can be formed of but a single diode appropriately poled.

The operation of the embodiment of FIGS. 1 and 2 can be described in connection with exemplary values. For instance, assuming that a sinusodial A.C. waveform (shown as 70 in FIG. 3A) of approximately ten volts peak value is applied across terminals 30 and 34 and a D.C. voltage level (shown as 72 in FIG. 3A) of precisely ten volts is similarly applied across terminals 32 and 34, the resistive network of parallel resistors 36 and 38 will sum these voltages. The summed waveform 74 appears at junction 40 reduced in overall amplitude due to the inherent attenuation characteristics of the resistive network.

Figure 4:
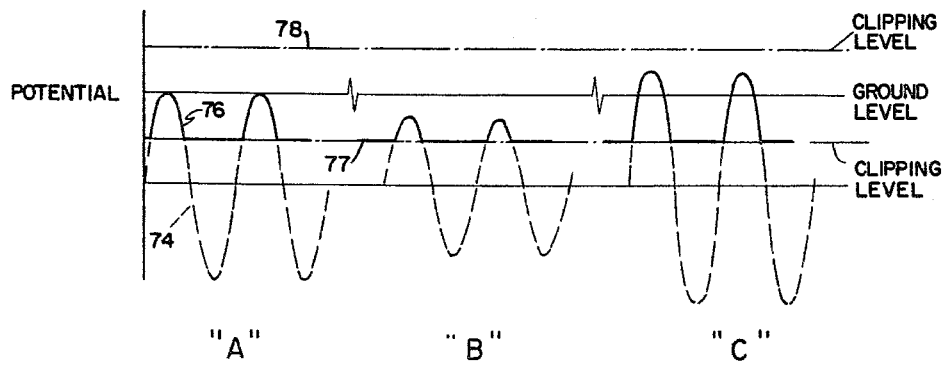
FIG. 4 is a graphical representation of exemplary waveforms showing clipping of the summed output waveforms (in broken lines) of FIG. 3 and the resulting clipped waveforms (in solid lines)

Summed waveform 74 is applied to limiting means 22. Because with a two diode limiter the anode of diode 42 and the cathode of diode 44 are both grounded, waveform 74 as shown in FIG. 4A (wherein the extent of deviation of waveform 74 from ground is exaggerated for the sake of clarity) will be limited or clipped within an amplitude range defined by two clipping levels 77 and 78 extending respectively on opposite sides of the ground level. Where the limiter includes but a single diode, the clipping need be only on that side of ground at which the bulk of the summed waveform appears. The value of the levels is established by the breakdown voltage of the diodes. For instance, with diodes as hereinbefore described the levels lie within limits of 0.7 volt on either side of ground, this value being a typical breakdown voltage. Hence, the maximum voltage passed by limiting means 22 in such case is about 1.4 volts, the vast bulk of which will lie within a 0.7 volt range on one side of ground. The only portion of waveform 74 passed by the limiting means is then that portion indicated at 76 bearing the information relating to the difference between the value of the D.C. reference voltage level 72 and the peak values of waveform 70. These latter portions may be termed the error signal. The limiting means not only serves to eliminate the portion of waveform 74 extraneous to the comparison, but that portion which would also introduce difficulties in subsequent amplification of the error signal in view of the overloading effect that large amplitude components would have on the following amplifier. Any limiting means of similar performance can be employed in like manner, although passive limiters are preferred.

The error signal is then applied to input terminal 46 of the chopper or zero comparator 24. Assuming the A.C. datum signal or waveform 70 to be, for instance, an audio or higher frequency signal, the line potential driving chopper coil 52 can be the usual 60 cycle voltage. Coil 52 can be driven at a multiple of the frequency of the fundamental waveform 70 to lock the chopper comparison rate with the input frequency so that the two will not drift with respect to one another. On the other hand, the chopped drive frequency can be asynchronous with respect to the A.C. signal frequency; this will result in a time shift of the output wave-train which will not, however, mar the readability of the wave-train but actually improve the readability.

Figure 3:
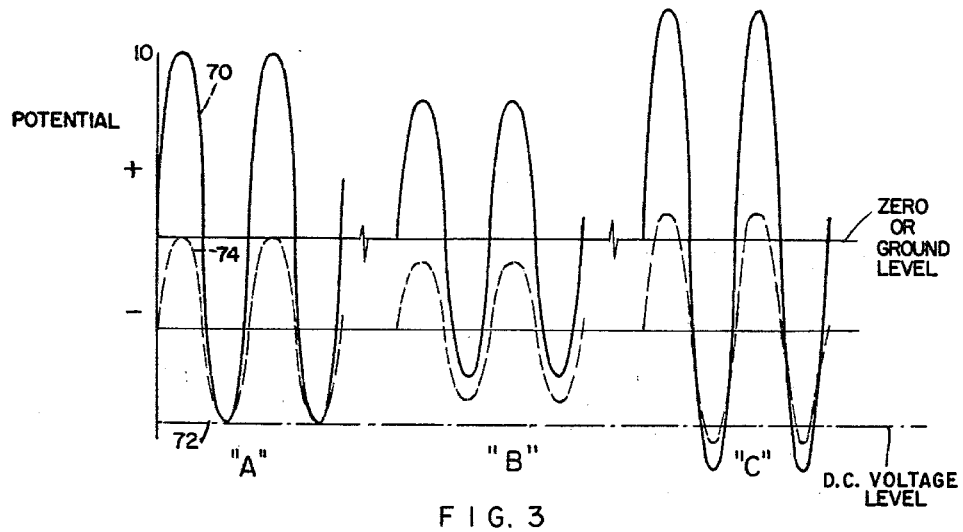
FIG. 3 is a graphical representation showing three exemplary waveforms of the inputs and outputs of the summing portion of the embodiment of FIG. 2.
Figure 5:
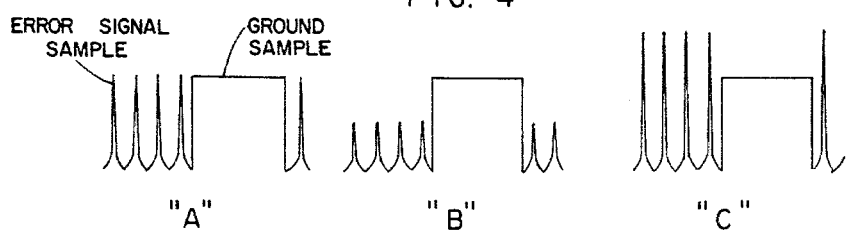
FIG. 5 is a graphical representation of three exemplary waveforms at the output of the "zero comparator" or chopper of both of the embodiments of FIG. 2.

The other terminal 48 of the chopper is grounded; hence, as chopper armature 54 vibrates between alternate contacts with terminals 46 and 48, the output of the chopper will consist of alternate samplings of the error signal and ground, both referred to the bias on the grounded side of the limiting means. A typical waveform of the chopper output is shown in FIG. 5A the time axis being considerably shortened in comparison to the time axis in FIGS. 3 and 4. Reference has heretofore been made only to the portion of FIGS. 3, 4 and 5 marked "A" in which a typical A.C. datum signal is selected to have a peak value exactly equal to the D.C. reference level. As will be seen in FIG. 5A, the error signal portion of the wave-train forming the output of the chopper, exhibits peak values exactly level with the peak value of the ground potential sample. Referring to portions "B" of FIGS. 3 through 5, inclusive, it will be seen that other exemplary A.C. datum signal peaks are selected to be somewhat smaller than the D.C. reference level, and this difference appears quite clearly in the difference between the peak values of the error signal sample forming the waveform of FIG. 5B. Similarly the selected exemplary A.C. datum signal of FIG. 3C is somewhat larger in peak value than the reference level, and this difference is clearly reflected in the disparity of the appropriate portions of the waveform of FIG. 5.

The resolution of the device is enhanced by applying the chopper output wave form to the input of amplifier 56. The latter need only have a bandwidth large enough to insure passage of relatively sharply clipped wave peaks without significant amplitude error. The amplifier may have a variable gain or may exhibit a fixed overall gain, for instance, of about thirty. The input resistor 60 to the amplifier is preferably of the same value as resistors 36 and 38, thus the overall attenuation of the signals introduced into amplifier stage 58 is a factor of three. Assuming then a three-to-one attenuation, an overall amplifier gain of thirty, and the exemplary values heretofore given of input voltages and of clipping levels, the output of amplifier 56 is therefore ten times the limited sum of the signals applied to terminals 30 and 32, about seven volts maximum at null.

To avoid overloading the read-out device, as well as to further increase resolution, the amplifier output is, in turn, applied to second limiting means 28 in which diodes 66 and 68 clip the amplifier's output, for example, within 0.25 volt levels set by the forward conducting potential of the diodes which, in such case, are germanium. Limiting means 28, as previously explained in connection with limiting means 22, can be formed of but a single appropriately poled diode. The output of limiting means 28 is now available for application to the oscilloscope's input.

For a typical oscilloscope with twenty millivolts per centimeter sensitivity, and capable of accepting two hundred fifty millivolts without overload, sensitivity referred to the input of the device would then be two millivolts per centimeter. Thus, four hundred microvolts will be readily discernible as 0.2 centimeter.

Hence, an error of four hundred microvolts between two input levels of the device up to twenty volts is easily seen thus implying a resolution of 0.002%. It will be seen that the inclusion of an automatic zero reference provided by the chopper to the input of amplifier insures that any small offset in the latter will be eliminated as an error factor. Additionally, it will be noted that in view of the fact that the ultimate determination of error is based upon the equality or inequality of the peak amplitude of the clipped A.C. with reference to the automatic ground or zero reference line, the oscilloscope is not being used as a precise read-out but rather as a null device. Thus, oscilloscope drift and variations in oscilloscope gain have been eliminated as error factors. The wave forms shown in FIG. 5 have heretofore been described as illustrative of the output of chopper or zero comparator 24. These wave forms are also typical of the wave form of the output of the second limiting means made available for oscilloscope display, it being understood that the coaction of the amplifier and second limiter reduces the total amplitude of the waveforms while enhancing the disparity of any difference between the peak value of the waveform sections, as well as sharpening the spikes which are proportional to the peaks of the input A.C. waveform.

It will be noted that in FIG. 2, in the operation of the chopper or zero comparator 24, chopper armature 54 alternately connects between ground and the error signal. For the sake of convenience, terminal 48 is shown directly connected to ground. However, a resistance which is equal to one-half the value of either of resistors 36 or 38 can be inserted between terminal 48 and its connection to ground so that the chopper switches to ground through a one-half value resistor. Thus, any amplifier offset current feeding to input terminal 46 will generate the same offset voltage independently of chopper position. In other words, a resistive network is provided which shows the same impedance for the amplifier to look back into through the chopper. During the one-half cycle when the chopper is grounded through the one-half value resistor, diodes 42 and 44 function as a shunt to ground to insure that the impedance seen by the A.C. and D.C. sources will tend to stay constant.

Figure 6:
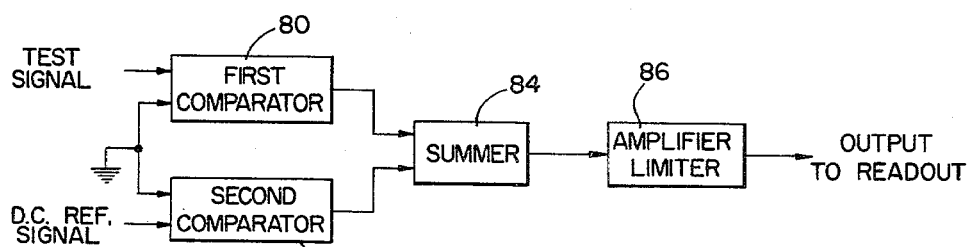
FIG. 6 is an alternative embodiment, in block diagram, of the invention.

Referring now to FIG. 6 there will be seen a preferred embodiment of the present invention comprising first comparator 80 for periodically comparing the datum voltage (again, for example, an A.C. signal) to ground. There is also included second comparator 82 for comparing the reference voltage to ground periodically and simultaneously with the comparison made by comparator 80. The two comparators can be synchronized by many well-known techniques. The outputs of comparators 80 and 82 are fed to summing means 84 and the summed output of the latter is introduced into means for amplifying and limiting a signal, such as amplifier-limiter 86. The amplifier-limiter output is the desired waveform.

Figure 7:
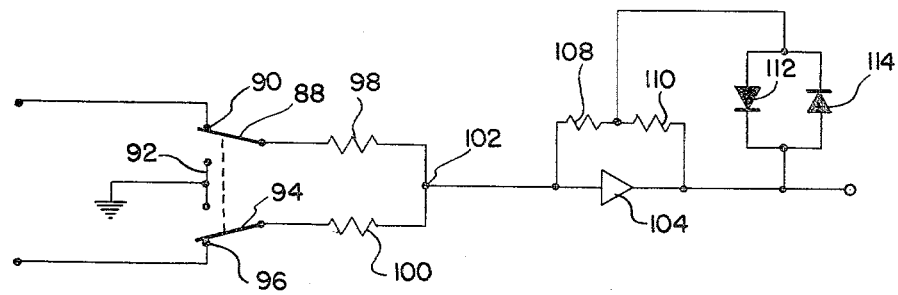
FIG. 7 is a schematic circuit diagram of one form of the embodiment of FIG. 6.

A schematic circuit diagram of the embodiment of FIG. 6 is shown in FIG. 7 wherein comparator 80 is shown as a chopper in which armature 88 can alternately switch between datum signal input terminal 90 and ground terminal 92. Similarly, comparator 82 is shown as another chopper in which armature 94 is movable between connections to reference signal input terminal 96 and ground terminal 92. Armature 88 is connected in series to one side of resistor 98. Armature 94 in turn is connected in series to one side of resistor 100. The other sides of the resistors are connected together to form summing junction 102. The summing means thus formed by the resistors is similar to that described in connection with FIG. 2.

Summing junction 102 is connected to the input of amplifier-limiter 86. The latter, in the form shown, includes a high-gain amplifier stage 104 similar to that described in connection with FIG. 2, having a negative feedback loop between its input and output. The feedback loop includes a pair of resistors 108 and 110 instead of the single resistor shown at 62 in FIG. 2. The limiter portion of the limiter-amplifier comprises a pair of diodes 112 and 114 forming a limiting means as heretofore described with reference to, for example, limiter 22 of FIG. 2. The parallel diodes are connected between the output of stage 104 and the junction of resistors 108 and 110.

Figure 8:
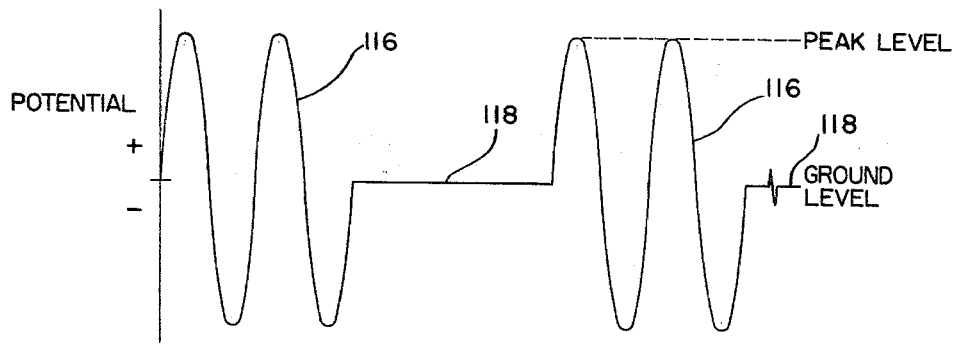
FIG. 8 is a graphical representation of an exemplary waveform of the output of one comparator of the embodiment of FIG. 7.
Figure 9:
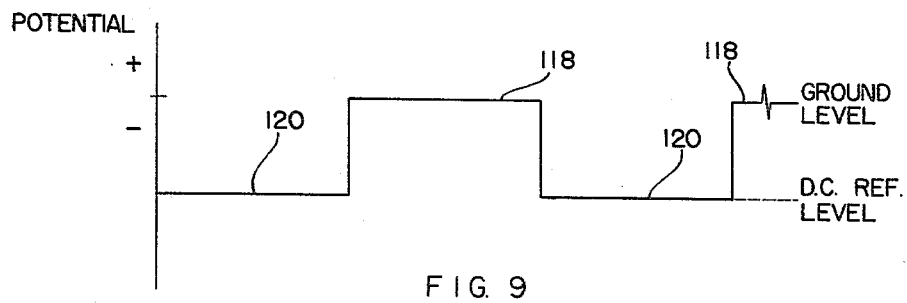
FIG. 9 is a graphical representation of an exemplary waveform of the output of another comparator of the embodiment of FIG. 7.

In operation, it will be seen that first comparator 80 will provide a typical waveform output such as shown in FIG. 8 comprising periodic samplings of the A.C. datum waveform 116 and ground level 118 as armature 88 alternately switches between the datum signal and ground. Similarly, the switching of armature 94 between the D.C. reference voltage and ground provides a waveform output, such as the square wave shown in FIG. 9, comprising periodic samplings of reference level 120 and ground level 118.

Figure 10:
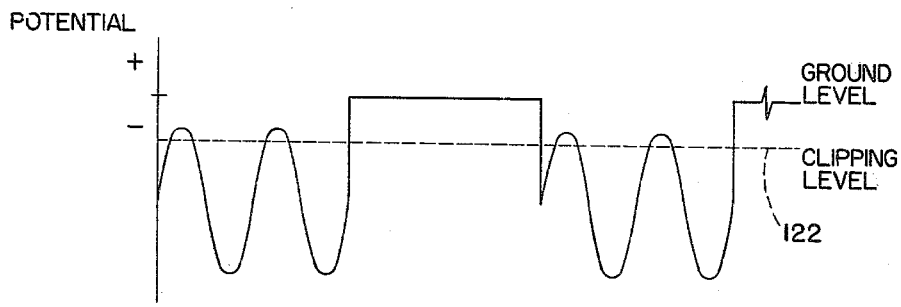
FIG. 10 is a graphical representation of the combined waveforms of FIGS. 8 and 9.

The two waveforms thus described, when applied respectively to the resistors in output of the comparators, because the chopper frequencies are the same and synchronized, are summed (datum signal with reference signal, ground with ground), so that at summing junction 104 the combined attenuated waveform would appear, such as is shown in FIG. 10, in the absence of amplifier 104. It should be noted in the latter figure, an exemplary peak value for the datum voltage has been selected which is somewhat lesser in magnitude than the D.C. reference voltage. The summed waveform is therefore composed of alternate samplings of the ground level and the attenuated sum of the datum and reference signals. Assuming arbitrary exemplary values, the datum signal may be a sinusoidal A.C. waveform having a peak value of slightly less than ten volts (for instance, about 9.9 volts), and the D.C. reference level precisely ten volts. This summed waveform is applied to the input of amplifier-limiter 86.

As previously noted in connection with the embodiment of FIG. 2, it is desirable to provide a limited input to the amplifier, for instance, to avoid the overloading effects of large amplitude components or the expense and difficulty of providing an amplifier capable of operating over an extremely wide range of voltage inputs. Even though the full current flows through summing junction 102 which is D.C. coupled to the amplifier input, it should be noted that the amplifier-limiter operates on only a portion of the resulting voltage. This is because the limiter formed by diodes 112 and 114 forms part of the negative feedback loop around amplifier stage 104, being parallel to resistor 110 and in series with resistor 108. It is possible to dispense with resistor 108 for providing a configuration in which all of the feedback resistance is shunted by the limiter diodes. However, practical considerations, in some instances, make it desirable to provide a small value of resistance in series with the diodes in order to suppress oscillations which might otherwise arise. Assuming that resistances 98 and 100 are each one thousand ohms, the peak current then at junction 102 would be approximately twenty milliamps. However, to insure a virtual ground at its input, the operational amplifier feeds a current back into the negative feedback loop, which current must then be approximately twenty milliamps also. If the total resistance in the feedback loop is, in this example ten thousand ohms, then the overall loop gain would be ten. The ten thousand ohms total resistance is provided, for instance, by selecting series resistor 108 as one hundred ohms, and resistor 110 as 9.9K ohms. If the limiter diodes are, for instance, of the silicon type heretofore described, as the amplifier output voltage rises to 0.7 volt, the diodes will conduct, bypassing the 9.9K ohms load. Thereafter, increases in feedback current will generally only provide an IR drop across resistor 108 inasmuch as diodes of this type exhibit a forward voltage drop of about 0.7 volt over a considerable current range. Hence, the output voltage of the amplifier is the sum of the inherent breakdown voltage of the forward biased diode and the IR drop across the small or nominal resistance of resistor 108.

The amplifier-limiter output will, therefore, provide a waveform such as is shown in FIG. 10 which is similar to that shown in FIG. 5B and which has been limited within a voltage level 122 on at least one side of ground as shown in FIG. 10, and wherein the difference between ground level and the peak values of the limited sum of the datum and reference signals has been amplified. Obviously the portion of the waveform of FIG. 10 appearing below the clipping level forms no part of the output of the amplifier-limiter. It is apparent that other stages of limiting or amplifying or both may be added to the amplifier-limiter output to further increase the resolution between peak values in the desired output waveform.

Although preferred embodiments of this invention have been disclosed and described in great detail, it will be understood that modifications thereof may be made within the true spirit and scope of the invention as recited in the following claims.

What is claimed is:

1. A precision device for comparing a datum voltage signal with a D.C. reference voltage, said device comprising in combination:
   means for alternately sampling said datum voltage signal and a ground potential for providing a first waveform therefrom;
   means for alternately sampling said reference voltage and said ground potential for providing a second waveform therefrom;
   means for combining said waveforms for forming a third waveform in which said datum voltage signal and said reference voltage are summed together, and
   means for limiting and amplifying said third waveform for provdiing a periodic signal in which the peak values of said summed voltages are clipped within predetermined limits on at least one side of said potential and the resolution between the value of said ground potential and said peak values is enhanced.

2. A precision comparison device as defined in claim 1 wherein each of said means for alternately sampling comprises switching means having a pair of input terminals, one of said terminals being adapted for connection to said ground potential, the other of said terminals being adapted for connection to the respective one of said datum voltage signal and said reference voltage.

3. A precision comparison device as defined in claim 1 wherein said means for combining said first and second waveforms comprises a network of at least two resistors of substantially identical value in parallel with one another and respectively connected to the output of a respective means for sampling.

4. A precision comparison device as defined in claim 1 wherein said means for limiting and amplifying the summed voltages comprises an operational amplifier having limiting means in its negative feedback loop.

5. A precision comparison device for comparing an oscillatory voltage with a direct current reference voltage, said device comprising in combination:
   a first input terminal for accepting said oscillatory voltage,
   a second input terminal for accepting said reference voltage,
   a third terminal connected to a fixed reference plane potential common to both said oscillatory and reference voltages,
   sampling means for simultaneously sampling during a first time interval both said oscillatory voltage on said first terminal and said reference voltage on said second terminal, and for simultaneously sampling during a second time interval said plane potential on said third terminal,
   summing means connected to said sampling means for combining the samples taken by said sampling means to form a first waveform, and
   means connected to said summing means for amplifying and limiting said first waveform and for providing to an output terminal a second waveform wherein any difference between the peak value of a sample derived from said oscillatory voltage and the value of a sample derived from said fixed reference plane potential is proportional to a corresponding difference between the peak value of said oscillatory voltage and the value of said reference voltage.

References Cited by the Examiner

UNITED STATES PATENTS

| 2,819,397 | 1/58 | Davis | 328—146 |
| 2,994,825 | 8/61 | Anderson | 328—129 |
| 3,015,074 | 12/61 | Taskett | 330—9 |
| 3,070,786 | 12/62 | MacIntyre | 330—9 X |

OTHER REFERENCES

"Electronic Analog Computers," Korn & Korn, 2nd edition, 1956, McGraw-Hill Book Co., Inc., pp. 308, Fig. 6.33(b).

IBM Technical Disclosure Bulletin, "Comparator," Wortzman, vol. 3, No. 1, June 1960, pp. 59, 60.

ARTHUR GAUSS, *Primary Examiner.*

JOHN W. HUCKERT, *Examiner.*

Disclaimer and Dedication 3,195,054.—*Peter L. Richman*, Lexington, Mass. PRECISION COMPARISON DEVICE, Patent dated July 13, 1965. Disclaimer and dedication filed Mar. 17, 1971, by the assignee, *Weston Instruments, Inc.*

Hereby enters this disclaimer to the remaining term of said patent and dedicates said patent to the Public.

[*Official Gazette April 27, 1971.*]